United States Patent [19]

Gibbemeyer

[11] 4,140,211
[45] Feb. 20, 1979

[54] WORKPIECE LOADER WITH RESILIENT END OF FEED CHUTE

[75] Inventor: Joseph F. Gibbemeyer, Cincinnati, Ohio

[73] Assignee: Cincinnati Milacron Inc., Cincinnati, Ohio

[21] Appl. No.: 850,685

[22] Filed: Nov. 11, 1977

[51] Int. Cl.² ............................................. B65G 11/20
[52] U.S. Cl. ..................................... 193/40; 221/243
[58] Field of Search ............. 193/25 R, 25 C, 25 FT, 193/32, 38, 40; 198/482, 540, 562, 796; 221/220, 307, 310, 243, 64

[56] References Cited

U.S. PATENT DOCUMENTS

| 865,132 | 9/1907 | Sternberg | 221/243 |
|---|---|---|---|
| 2,955,724 | 10/1960 | Deucher | 221/243 X |
| 3,032,160 | 5/1962 | Kay et al. | 193/38 |
| 3,255,856 | 6/1966 | Sillars | 193/40 X |
| 3,958,685 | 5/1976 | McDonald et al. | 198/377 |

Primary Examiner—Robert B. Reeves
Assistant Examiner—James L. Rowland
Attorney, Agent, or Firm—Daniel P. Worth

[57] ABSTRACT

The track of the loading chute 105 of FIGS. 6 and 7 in U.S. Pat. No. 3,958,685 is provided with a stop mounted on a leaf spring so that the stop moves aside readily if a workpiece (thermoplastic preform 2B) is misaligned during feeding by the lifter assembly 106, thus reducing malfunctions.

7 Claims, 5 Drawing Figures

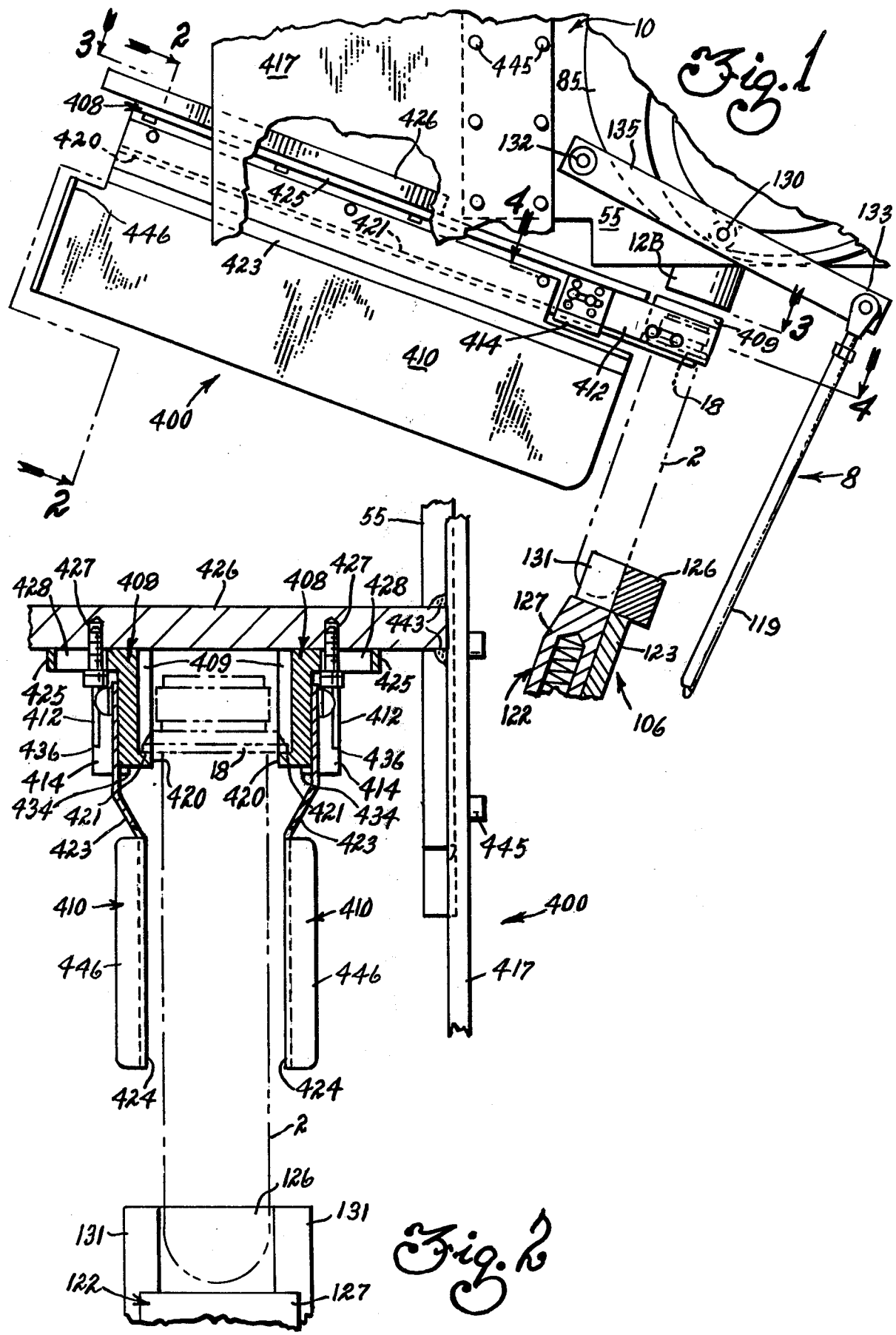

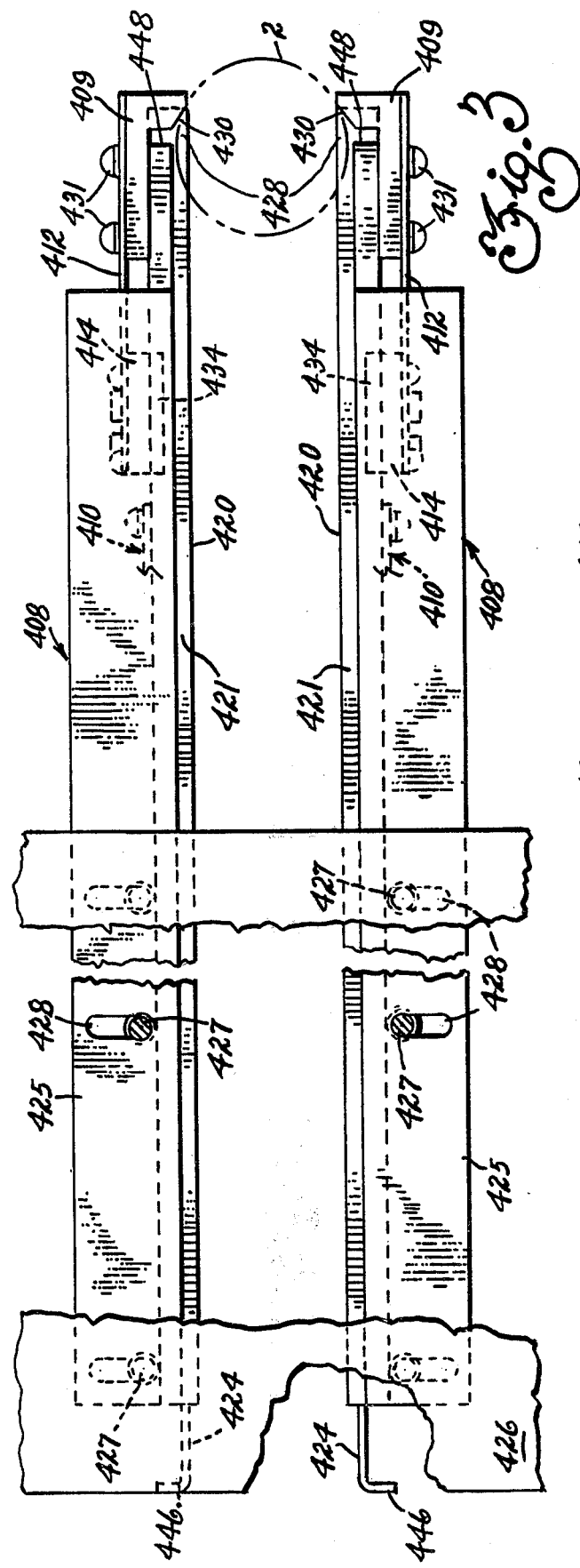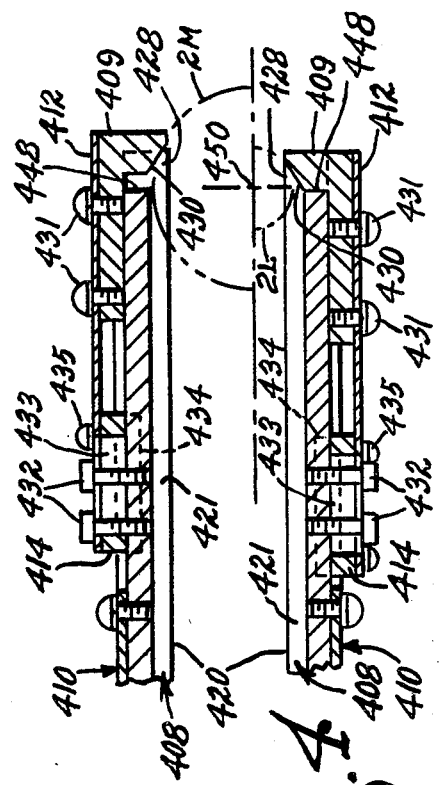

WORKPIECE LOADER WITH RESILIENT END OF FEED CHUTE

SUMMARY OF THE INVENTION

The invention relates to a workpiece loader having a resiliently mounted stop at the end of a feed chute. The most specific aspect of the invention is a spring mounted stop at the end of the loading chute of the workpiece loading means shown in FIGS. 6 and 7 of U.S. Pat. No. 3,958,685 which is expressly incorporated herein in its entirety and in connection with which the invention will be described.

BACKGROUND OF THE INVENTION

On random occasions the preform being fed by the loading means of U.S. Pat. No. 3,958,685 FIGS. 6 and 7 jams in a position between the track and the coupling. Some of the reasons for jamming are warped preforms and assumption of a cocked position in the coupling. Whatever the reason, jamming at this location has led to damage of the machine and the preform and a consequent loss of production.

Simply stated, the present invention provides a spring mounted end for the loading chute track. This permits the loading means to resiliently give in response to a jammed or misaligned preform being pulled forcefully out of the track end for the coupling which has engaged it during loading. The prior structure (e.g. the cited U.S. Patent) was sufficiently rigid and not able to "give" or move out of the way that damage to the machine and/or preform often resulted.

More broadly, the present invention provides a resiliently supported stop member at the end of the feed chute track in the aforesaid loading means.

Thus, the present invention provides a machine for use in feeding a series of workpieces along a path to a predetermined location, each workpiece being elongated and having an enlarged head at one end and a body of smaller dimension than said head, said machine having a pair of upper tracks with upwardly facing support surfaces for engaging the underside of each said head and being spaced apart laterally sufficiently to receive said workpiece body therebetween and to support same by its head on said surfaces, at one end of at least one of which tracks is a stop shoulder extending laterally at least enough to engage said head and to prevent its passage, the improvement comprising a resilient mounting of the stop shoulder adjacent said end with a structure that includes said stop shoulder being structurally separate from said track and extending approximately laterally as aforesaid, and resilient means for supporting said stop shoulder to allow approximate lateral motion of said stop shoulder responsive to a workpiece being moved past said stop shoulder in a direction at least partly along said track.

Other objects, advantages, and features will become apparent from the following drawings wherein:

FIG. 1 corresponds approximately to FIG. 6 of the cited patent of which it shows the pertinent parts — with changes in a side view from the right hand side in partial section — of the loading end of the conveyor showing a loading means according to the invention for presenting and feeding workpieces to a coupling of the conveyor;

FIG. 2 corresponds approximately to FIG. 7 of the cited patent of which it shows the pertinent parts — with changes — and is an end view along 2—2 of FIG. 1 of one of the preform (workpiece) loading means it being understood that the others are preferably constructed in like manner and are preferably arranged four abreast, i.e. four in each lateral row or rank;

FIG. 3 is a top view along 3—3 of FIG. 1 of a portion of the feed chute of FIG. 1;

FIG. 4 is a top section view of the spring mounted end along 4—4 of FIG. 1 showing by half views the parts positions for the smallest and largest preforms 2L and 2M respectively.

Figure 5:
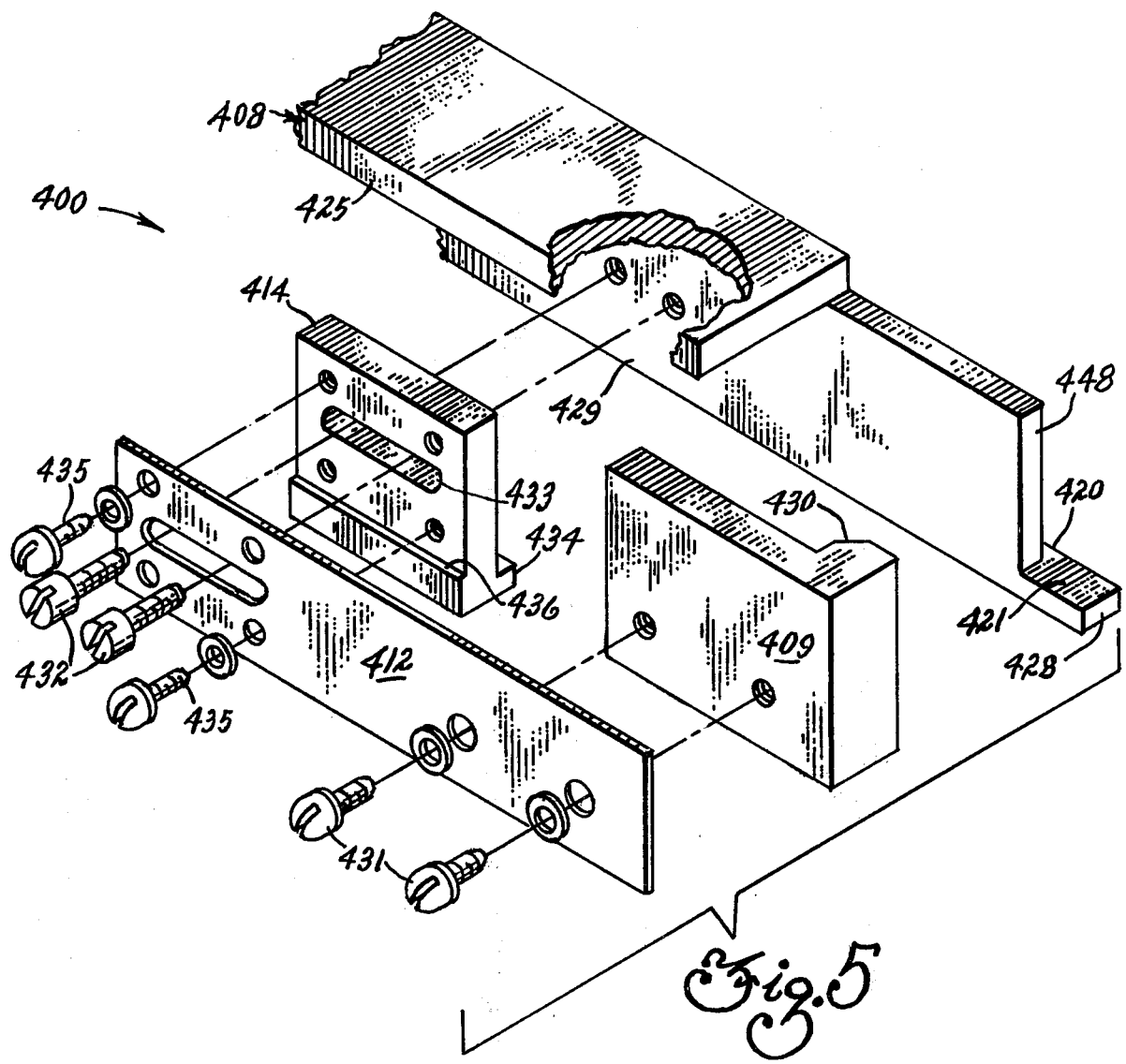
FIG. 5 is an exploded perspective of the spring mounted end of FIG. 4.

Reference numbers are coded to facilitate identifying the various parts: all numbers 400 and higher identify parts of the present invention and things not the same as in U.S. Pat. No. 3,958,685 whereas all other numbers and their parts are substantially the same as or identical to that in 3,958,685. The reader is referred to said U.S. patent for details of its parts and their functions. Elements numbered but not described herein are described in said patent.

General

The invention is preferably used and described in connection with conveying preforms 2 of polyethylene terephthalate shaped generally like a test tube as further described and shown in said patent.

The workpiece 2 is a hollow, generally cylindrical body of thermoplastic resin having one end closed and the other an enlarged head presenting at least one support ring 18 by which said preform can be supported during the operations described herein and, for that matter, those in said patent and in subsequent processing such as filling of a bottle. More particularly, the invention is concerned with the loading means 8 for feeding said preform into a conveyor 10 which then carries it through an oven or other processing means ultimately to a blow molding means where the preform is converted into a bottle. The lifting assembly 106 feeds the preforms 2 one at a time into a succession of couplings 12 which are likewise presented one at a time at a location 12B where such longitudinal motion of the preform pushes the enlarged head thereof into engagement with the coupling.

As explained in said patent, the conveyor means 10 of which the present invention is a part is preferably arranged to carry a plurality of preforms — more preferably four preforms — in side-by-side relationship simultaneously through the oven or other processing means. This side-by-side relationship is also called a rank or lateral row. In this manner, four at a time are processed in substantially identical ways and produce a corresponding number of bottles or other products. As explained in the patent, loading by the assembly 8 (and its component lifter 106) takes place during those times that the couplings 12 are not advanced.

As illustrated in FIG. 1 and to assist the reader in orienting himself, one lifter assembly 106 is provided for each file of couplings but only one such lifter is described in the patent and here. It has a base plate 123 secured to the main frame of a machine, a cap 126 shaped like a U or a channel to receive the end of the workpiece, a foot 127 slidably supported on a peg and spring biased away from the peg (see cited patent) to accomodate preforms of a slightly different length and allow some give during feeding in such random events. Ears 131 on cap 126 provide lateral and axial support to the cap. A feeder face cam 85 engages follower 130 on follower arm 135 which is pivoted at 132 and has a swinging end 133 that pivotally connects follower rod 119 to a part not shown herein but described in said patent as a crossbar 117. The members described in this paragraph drive the lifter assembly.

The referenced U.S. patent refers to a loading chute 105, tracks 108, stop 109, and lower tracks 110 supported by vertical arms 111 to assist in positioning the lower end of dangling preforms. It is in these members and especially the junction of track 108 and stop 109 where the instant invention in pertinent part resides. The loading chute is now renumbered as 400 and comprises right-hand and left-hand subassemblies with corresponding parts of each hand having the same number as shown e.g. in FIGS. 2 and 3. Each chute assembly (FIG. 5) 400 comprises a guide bracket 408, stop 409, depending skirt or preform guide 410, a spring or resilient stop mount 412, and spacer block 414 as well as numerous fasteners. There are also support means 417 described below for connecting the chute assemblies 400 to the machine frame.

Each guide bracket 408 has a Z-shaped cross-section providing on its lowermost flange 420 a track with an upper surface 421 for engaging the support ring 18 on the preform 2 thereby to vertically suspend the preform as illustrated in FIGS. 1 and 2. To the outside of each track is secured, preferably by a plurality of bolts, the depending skirt or preform guide 410 preferably of sheet metal or similar material. The lower end of the preform guide has been bent inwardly at midregion 423 to provide lower guide tracks 424 for positioning the preform laterally and with respect to the loading means 106.

The upper flange 425 of the guide brackets is secured to a lateral cross-plate 426 on the machine by a plurality of bolts 427. These bolts fit in elongated holes 428 in the guide bracket. The elongated holes permit lateral adjustment of the guide brackets and its associated preform guide, etc. when adjusting the chute for different size or diameters of preforms. A web 429 connects the two bracket flanges.

The resilient or spring mounted end of the chute has a resiliently supported stop shoulder 430 which faces inwardly and engages a forward facing portion of the enlarged preform head. Preferably, the engaging face of the stop shoulder 430 is part of the stop block 409 and is oblique to the path along which the preform moves, converging toward the preform exit end (the movement being caused by gravity due to the sloping surface on the track) to provide a centering action from a pair of opposed obliques (e.g. as in FIG. 3).

Bolts 431 mount the stop 409 on a resilient means preferably a single leaf spring 412 with its stop surface 430 or stop shoulder being above the track 421 of the lower flange 420 of the guide, e.g. FIGS. 3,4. The leaf spring 412 in turn is secured to the spacer block 414 which is adjustably secured to the outer end of the guide bracket way. Bolts 432 secure the spacer to bracket 408 through elongated bolt hole 433 (FIG. 5), the hole being longer than bolt spacing for movement longitudinally of the preform path and of the guide bracket, etc. when adjusting. The block 414 has a locating flange 434 that fits immediately underneath the bottom edge of the guide bracket.

The leaf spring 412 is secured to the spacer block 414 by a plurality of fasteners such as bolts 435 (FIG. 5) to threaded holes in the spacer block. Alignment of the leaf spring is facilitated by providing a spring locater flange 436 on the lower outside of each spacer block.

A plurality of the herewith improved chutes are secured by bolts 427 to a lateral support plate 426 disposed at an angle and extending laterally of the machine. This support plate in turn is secured as by welding 443 to an end plate 417 located on each side of the machine and secured by bolts 445 to the conveyor side plates 55. As is clear from the drawings, the upper flange 425 of the guide bracket is fastened by a plurality of bolts or the like to the underside of this support plate and is held in the downward sloping position. As can be seen from FIGS. 1 and 3, the bottom surface of the stop block 409 is located immediately above a forward extension 428 of the guide bracket track formed by cutting away part of the web and upper flange of the bracket. This arrangement provides the requisite support for engaging the ring 18 on the preform at the same time that the preform is held in position at the end of the track ready for loading.

It will also be observed that this invention may be used in conjunction with the preform release means of my own co-pending application Ser. No. 768,323 filed Feb. 14, 1977, now abandoned, which releases preforms one at a time to a position where they can engage the stop surface 430 provided by a stop 409. Inasmuch as the invention of such application is separate and distinct from this, no description of it is given herein. It should be noted that the respective skirts or preform guides can have openings therein so the finger portions of such release means can extend therethrough.

The skirt or preform guide member in addition to being inwardly bent at middle region 423 also has a flange 446 on its upstream end to facilitate entry of the preform. It also has a cutout at its upper downstream side to accomodate the spring and support block described above.

Preforms of a variety of sizes may be handled by the present invention. As illustrated best in FIG. 4, where the least 2L and maximum 2M contemplated diameter preforms are shown in dotted lines adjacent the stop, it only requires a longitudinal adjustment of the stop 409 and lateral adjustment of the guide 408 and, for that matter, of the stop shoulder to accomodate a change in preform diameter. The purpose of this adjustment is to maintain the preform center axis aligned with — indeed coaxial with — the center line along which the lifter assembly 106 and its component preform feeder assembly 122 feeds the respective preforms into the waiting couplings 12B.

As best shown in FIG. 5, the downstream end of the bracket 425 is shaped to accomodate the resilient mounted stop means. The web is cutaway at 448 (FIG. 5) to provide lateral longitudinal clearance to receive the stop shoulder 430 and allow for selective adjustment and positioning it to receive the size range of preforms 2L-2M as illustrated in FIG. 4. The shoulders 430 are adjusted so as to keep the preform substantially coaxial with the axis of the collet 12, i.e. aligned with point 450 substantially (FIG. 4), 450 representing such axis. Clearances are, of course, provided so the stop block doesn't rub.

In operation should a malfunction occur with misalignment or jamming of the preform, the spring mounted stop 409 is moved out of the way when the preform 2 is pulled along by the coupling 12 with which it has become engaged, albeit the engagement with the coupling may not be complete or the preform is deformed, etc. This ability of the chute 400 to resiliently give and then return to operating position minimizes the damage that may occur from jamming.

What is claimed is:

1. In a device for feeding a series of vertically depending workpieces to a predetermined location where a queue of such workpieces accumulates, each workpiece being generally cylindrical and having at one end an enlarged head of larger dimension than the rest of said workpiece, said device for feeding having a pair of upper tracks with upwardly facing support surfaces and spaced apart laterally on each side of said queue sufficiently to receive the depending bodies of said workpieces therebetween to support said workpieces by their heads on said support surfaces and to guide said workpieces and, at one end of each of which tracks is supported a stop shoulder extending laterally of said tracks at least enough to engage said head and thus ordinarily prevent passage of that preform in the queue that engages said shoulders, the improvement comprising a resilient mounting of said stop shoulder at the end of each said track with a structure that includes each said stop shoulder being separate from and movable relative to its corresponding said track and extending laterally as aforesaid, and means for supporting and resiliently biasing each said stop shoulder above the terminal end of said track to allow lateral motion of said stop shoulder against said biasing responsive to a workpiece being moved past said stop shoulder in a direction at least partly along said track and whereby the enlarged head of each said workpiece may receive subjacent support from said track upwardly facing support surfaces while being moved along said track to said stop shoulders, said stop shoulders being supported opposite each other and in alignment with said supporting surfaces of said tracks.

2. In a device according to claim 1 the improvement wherein each said means for supporting and resiliently biasing is a spring.

3. In a device according to claim 2 the improvement wherein each of said springs is a leaf spring.

4. In a device according to claim 1 the improvement further comprising means for adjustably supporting said tracks and said means for supporting and resiliently biasing to allow lateral and longitudinal adjustment and secure same relative to said tracks.

5. In a machine for use in feeding a series of workpieces along a path to a predetermined location, each workpiece being elongated and having an enlarged head at one end and a body of smaller dimension than said head, said machine having a pair of upper tracks with upwardly facing support surfaces for engaging the underside of each said heads and being spaced apart laterally sufficiently to receive said workpiece body therebetween and to support same by its head on said surfaces, at one end of at least one of which tracks is a stop shoulder extending laterally at least enough to engage said head and to prevent its passage, the improvement comprising a stop block;

a resilient mounting of said stop shoulder adjacent its corresponding said end with a structure that includes said stop shoulder being a surface on said block that extends obliquely of said track and being structurally separate from and movable relative to said track and extending approximately laterally as aforesaid, and means for supporting and resiliently biasing said stop shoulder to allow approximate lateral motion of said stop shoulder against said biasing responsive to a workpiece being moved past said stop shoulder in a direction at least partly along said track.

6. In a machine according to claim 5 the improvement wherein said resilient means for supporting and resiliently biasing is a spring.

7. In a machine according to claim 6 the improvement comprising said resilient means being a leaf spring.

* * * * *